Patented Sept. 6, 1938

2,129,289

UNITED STATES PATENT OFFICE 2,129,289

MANUFACTURE OF NEW FLUORINE COMPOUNDS

Julius Söll, Leverkusen-I. G. Werk, Germany, assignor to I. G. Farbenindustrie Aktiengesellschaft, Frankfort-on-the-Main, Germany No Drawing. Application April 10, 1935, Serial No. 15,723. In Germany April 21, 1934

6 Claims. (Cl. 260—1)

This invention has for its object the manufacture of new elastic compounds containing fluorine and the products and objects obtained thereby; more particularly it relates to fluorine containing rubber, synthetic rubber-like masses and substitutes for rubber which are very valuable materials for tightening and insulating electrolytic cells for the production of fluorine.

In the production of fluorine by electrolysis of fluorides especially acid alkali metal fluorides, such as potassium bi- or polyfluorides, the electrodes and eventually also the diaphragm usually employed and the vessel for the electrolyte must be insulated from one another. Hitherto, for this purpose mineral substances, such as fluor spar have been employed. However, these substances because of their low elasticity and their great hardness were not very well suited as insulating agents.

In accordance with the present invention rubber, synthetic rubber-like masses and substitutes for rubber have proved suitable when subjected to a special treatment with fluorine.. This is the more surprising since it is known that rubber and similar compounds react vigorously and in most cases take fire when brought into contact with pure fluorine.

In accordance with the invention rubber, synthetic rubber-like masses and substitutes for rubber are treated with dilute fluorine. Thereby the rubber etc. is converted into a substitution product containing fluorine. This substitution product has the same physical characteristics as the untreated product but it is resistant to the influence of free fluorine also in a concentrated form. The compound thus treated with fluorine is a very valuable material for tightening and insulating electrolytic cells for the production of fluorine. For obtaining the fluorine treated compound the fluorine can be diluted by indifferent gases, for instance, in the proportion 1:1 to 1:10. As indifferent gases air, nitrogen, $CO_2$ and so on can be employed. The objects treated in this manner take up fluorine on the surface and the surface contains between about 1 to 10% of fluorine. When the reaction is carried out for a prolonged time the object treated takes up still more fluorine. The reaction of the fluorine on the rubber etc. can also be performed by dissolving the rubber in an appropriate solvent, such as carbon tetrachloride and introducing fluorine into this solution. In this manner products are obtained which contain up to 30% of fluorine.

Besides natural rubber, synthetic rubber-like masses, as are obtainable for instance by polymerization of isoprenes and butadienes, can be subjected to the fluorine treatment but also rubber substitutes, such as white and brown factices yield, when treated with dilute fluorine, very fluorine resisting tightening and insulating materials, particularly when mixed with fluorine treated rubber.

As above specified fluorine treated rubber, synthetic rubber-like masses and substitutes for rubber are well suited for tightening and insulating electrolytic cells for the production of fluorine. When constructing an electrolytic cell for the production of fluorine, tightening and insulating means which are pretreated with fluorine can be built in, but it is likewise possible to provide the parts of the cell to be tightened or insulated with rubber etc. which has not been treated with fluorine, and to effect the treatment with fluorine by bringing the cell into operation. Also in that case the fluorine is used in the diluted form since in the beginning the apparatus is filled with air.

The new tightening and insulating material can be applied to all known fluorine production apparatus. When using for instance as electrolyte molten potassium bifluoride the fluorine treated rubber stopper insulating the anode is protected against super-heating by means of cooling with water, since in this case the electrolysis is effected at about 250° C. When using potassium polyfluorides as electrolytes cooling is only necessary if higher temperatures are intended to be applied. When using, for instance, potassium trifluoride or tetrafluoride, no cooling at all is necessary, since the electrolysis can be performed at about 70–90° C. In the electrolytic cells fluorine treated rubber stoppers and rubber packings can be applied, but also rubber plates can be used which are obtainable by vulcanization of soft or hard rubber mixtures upon single parts of the apparatus and treatment with dilute fluorine. To avoid the hydrogen evolution occurring at the bottom of the apparatus beneath the fluorine chamber by which a mixture of hydrogen and fluorine may be formed, whereby explosions may occur, the bottom is covered with a fluorine treated rubber layer. By the application of fluorine treated rubber packings and covers it is possible to use for the production of fluorine such apparatus as are used for the electrolysis of water, for instance, uni- or bi-polar cells or filter press apparatus.

I claim:—

1. Process of producing a fluorine containing derivative of a compound of the group consisting of rubber, synthetic rubber-like masses and substitutes for rubber which comprises contacting the compound with fluorine diluted by an indifferent gas.

2. Process of producing a fluorine containing derivative of a compound of the group consisting of rubber, synthetic rubber-like masses and substitutes for rubber which comprises contacting the compound with fluorine diluted by an indifferent gas of the group consisting of air, nitrogen and carbon dioxide.

3. Process of producing a fluorine containing derivative of a compound of the group consisting of rubber, synthetic rubber-like masses and substitutes for rubber which comprises contacting the compound with fluorine diluted by air.

4. Process of producing a fluorine containing derivative of a compound of the group consisting of rubber, synthetic rubber-like masses and substitutes for rubber which comprises contacting the compound with fluorine diluted by nitrogen.

5. Process of producing a fluorine containing derivative of a compound of the group consisting of rubber, synthetic rubber-like masses and substitutes for rubber which comprises contacting the compound with fluorine diluted by carbon dioxide.

6. A fluorine containing elastic rubber compound selected from the group consisting of fluorine containing natural rubber, synthetic rubber-like masses and substitutes for rubber, said compound having the physical characteristics of the fluorine-free compound, but being resistant to the influence of free fluorine and being substantially identical with the product of the process of claim 1.

JULIUS SÖLL.

DISCLAIMER 2,129,289.—*Julius Söll*, Leverkusen-I. G. Werk, Germany. MANUFACTURE OF NEW FLUORINE COMPOUNDS. Patent dated September 6, 1938. Disclaimer filed February 21, 1939, by the assignee, *I. G. Farbenindustrie Aktiengesellschaft*.

Hereby disclaims claims 1, 4, 5, and 6 of said Letters Patent.

[*Official Gazette March 21, 1939.*]